United States Patent
Tønnessen et al.

(10) Patent No.: US 10,407,135 B2
(45) Date of Patent: Sep. 10, 2019

(54) MOTION COMPENSATION FOR RELATIVE MOTION BETWEEN AN OBJECT CONNECTED TO A VESSEL AND AN OBJECT IN THE WATER

(71) Applicant: PGS Geophysical AS, Oslo (NO)

(72) Inventors: Rune Tønnessen, Oslo (NO); Torbjørn Ursin, Oslo (NO)

(73) Assignee: PGS GEOPHYSICAL AS, Oslo (NO)

( * ) Notice: Subject to any disclaimer, the term of this patent is extended or adjusted under 35 U.S.C. 154(b) by 88 days.

(21) Appl. No.: 15/184,701

(22) Filed: Jun. 16, 2016

(65) Prior Publication Data

US 2016/0375963 A1    Dec. 29, 2016

Related U.S. Application Data (60) Provisional application No. 62/185,819, filed on Jun. 29, 2015.

(51) Int. Cl.
| | |
|---|---|
| *B63B 21/66* | (2006.01) |
| *G01V 1/38* | (2006.01) |
| *B63G 8/00* | (2006.01) |
| *B63B 27/16* | (2006.01) |

(52) U.S. Cl.
CPC ............. *B63B 21/66* (2013.01); *G01V 1/38* (2013.01); *B63B 2027/165* (2013.01); *B63B 2723/00* (2013.01); *B63G 2008/008* (2013.01)

(58) Field of Classification Search
CPC ..... B63B 21/66; B63B 2723/00; B63G 8/001; B63G 2008/008; G01V 1/38
See application file for complete search history.

(56) References Cited

U.S. PATENT DOCUMENTS

| | | | |
|---|---|---|---|
| 4,666,357 A | 5/1987 | Babbi | |
| 4,794,575 A | 12/1988 | Miller | |
| 5,077,696 A | 12/1991 | McEachern et al. | |
| 6,390,012 B1 * | 5/2002 | Watt .................. | B63B 27/36 |
| | | | 114/322 |
| 7,731,157 B2 | 6/2010 | Davidson | |
| 7,934,561 B2 | 5/2011 | Ormond | |
| 8,646,399 B2 | 2/2014 | MacKinnon | |

(Continued)

FOREIGN PATENT DOCUMENTS

| | | |
|---|---|---|
| WO | 2015020529 A1 | 2/2015 |
| WO | 2015049679 A1 | 4/2015 |

OTHER PUBLICATIONS

Wikipedia, Sonar, Feb. 2016, https://web.archive.org/web/20130216020838/https://en.wikipedia.org/wiki/Sonar.*

(Continued)

*Primary Examiner* — Aaron L Troost
(74) *Attorney, Agent, or Firm* — Patterson + Sheridan, LLP (57) ABSTRACT

Certain aspects of the present disclosure generally relate to motion compensation between water-borne objects, and, more particularly, to synchronizing motion between a remotely operated vehicle (ROV) and a docking station of a launch and recovery system (LARS). An exemplary method includes receiving a measurement corresponding to a particle motion in water surrounding an ROV and synchronizing motion of a docking station with a motion of the ROV based at least in part on the measurement corresponding to the particle motion.

23 Claims, 5 Drawing Sheets

(56) References Cited

U.S. PATENT DOCUMENTS

| | | | |
|---|---|---|---|
| 8,654,607 B2* | 2/2014 | Strong | G01S 15/58 367/90 |
| 8,939,702 B2 | 1/2015 | Buchan et al. | |
| 8,967,067 B2 | 3/2015 | Soreau et al. | |
| 2005/0278094 A1* | 12/2005 | Swinbanks | B63B 17/0081 701/37 |
| 2007/0177944 A1 | 8/2007 | Smith et al. | |
| 2007/0272906 A1 | 11/2007 | Davidson | |
| 2008/0205990 A1 | 8/2008 | Bird | |
| 2009/0052992 A1 | 2/2009 | Thompson et al. | |
| 2010/0302908 A1* | 12/2010 | Strong | G01S 15/58 367/90 |
| 2013/0163374 A1* | 6/2013 | Herrmann | G01V 1/3852 367/20 |
| 2014/0321236 A1* | 10/2014 | Lelaurin | E02D 29/06 367/15 |
| 2015/0086299 A1* | 3/2015 | Jamieson | B63G 8/001 414/139.6 |
| 2015/0092178 A1* | 4/2015 | Debrunner | G01S 17/89 356/4.01 |
| 2016/0176486 A1* | 6/2016 | Korneliussen | B63G 8/001 114/257 |
| 2017/0168174 A1* | 6/2017 | Dowle | G01V 1/137 |

OTHER PUBLICATIONS https://web.archive.org/web/20140317220747/https://en.wikipedia.org/wiki/Ultra-short_baseline, Mar. 17, 2014. (Year: 2014).*
European Search Report for Application No. 16176020.2 dated Nov. 24, 2016.

* cited by examiner

MOTION COMPENSATION FOR RELATIVE MOTION BETWEEN AN OBJECT CONNECTED TO A VESSEL AND AN OBJECT IN THE WATER

CROSS-REFERENCE TO RELATED APPLICATIONS

The present Application for Patent claims priority to U.S. Provisional Application No. 62/185,819, filed Jun. 29, 2015, which is assigned to the assignee of the present application and hereby expressly incorporated by reference herein in its entirety.

BACKGROUND

Field of the Disclosure

Certain aspects of the present disclosure generally relate to motion compensation between water-borne objects, and, more particularly, to synchronizing motion between a remotely operated vehicle (ROV) and a docking station of a launch and recovery system (LARS).

Description of Related Art

Marine seismic surveys are one type of marine geophysical survey which utilizes sound waves transmitted to the earth's crust and reflected back to recording sensors. The recording sensors may be hydrophones or other sensors in one of a number of towing assemblies, commonly called streamers, that may be towed behind a survey boat. When towed behind the survey boat, the streamer may be submerged. A sound, or other energy, source may also be towed in the water behind the survey boat for transmitting energy waves to be received by the receivers of the streamers. One common application of marine geophysical surveying is oil and gas exploration in marine environments. More particularly, sound waves received during a marine seismic survey may be analyzed to locate hydrocarbon bearing geological structures, and thus determine where deposits of oil and natural gas may be located. In a similar fashion, marine electromagnetic (EM) surveys may be conducted using EM energy transmitted by a submerged antenna and detected by EM receivers.

Remotely operated vehicles (ROVs) may be useful for supporting marine geophysical surveying. For example, an ROV may be deployed to maintain (e.g., clean, repair) a streamer towed behind a survey boat, allowing maintenance of a streamer without reeling the streamer back onto the survey boat. ROVs may also be used for other tasks in marine exploration, such as placing equipment on the seabed.

ROVs may be deployed from a mother vessel equipped with a launch and recovery system (LARS). A LARS can be equipped with active heave compensation (AHC) to keep an ROV docking station, for example, a tether management system (TMS), of the mother vessel stable while a vessel (e.g., the mother vessel) coupled to the ROV docking station is subjected to motion, e.g., heave, roll, and/or pitch, etc. In some situations, launching and/or recovering an ROV, from the ROV docking station, takes place in deep water (e.g., 100 meters), away from the influence of free surface water waves. In general, the effects of wave particle motion and/or the wave pressure decay exponentially with water depth and thus, when launching and recovering an ROV in deep water, the vertical motion of the ROV induced by free surface waves can be neglected. The motion of the docking station induced by the effect the motion of the vessel has on the docking station can be counteracted, e.g., by AHC. Counteracting the effect the vessel has on the docking station can allow for improved launching and/or docking of the ROV.

Launching and recovery of an ROV, from the ROV docking station, is not always performed in deep water. In some situations (for example, when an ROV is being used to maintain a streamer being towed behind a survey boat), it may be advantageous to launch and recover an ROV close (e.g., less than ten meters) to the sea surface. In situations where launching and recovery (e.g., undocking and docking) takes place close to the sea surface, the motion of the ROV can be affected by particle motions and/or pressure fluctuations from the free surface waves. As an example, if the free surface waves are large in comparison to the docking depth, the motion of the ROV can be affected by wave particle motion and/or wave pressure. Motion of the ROV during launch and recovery operations can interfere with those operations, possibly damaging the ROV, docking station, and/or LARS. It is therefore desirable to counteract motion of an ROV during launch and recovery operations.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

According to embodiments of the present disclosure, techniques are provided to compensate for relative motion between an object connected with a vessel floating on water and an object in the water. The provided techniques include methods, systems, and machine-readable media for compensating for relative motion between an object connected to a vessel and an object in the water. For example, a system operating according to the present disclosure may be configured to minimize relative vertical motion between a docking station connected to a vessel (e.g., a mother vessel) and an ROV in the water.

It is to be understood the present disclosure is not limited to particular devices or methods, which may, of course, vary. This disclosure may be embodied in many different forms and should not be construed as limited to any specific structure or function presented. It is also to be understood that the terminology used herein is for the purpose of describing particular embodiments only, and is not intended to be limiting. As used herein, the singular forms "a", "an", and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The word "exemplary" is used herein to mean "serving as an example, instance, or illustration." Any aspect described herein as "exemplary" is not necessarily to be construed as preferred or advantageous over other aspects.

ROVs may be useful for supporting marine geophysical surveying. For example, an ROV may be deployed to maintain (e.g., clean, repair) a streamer towed behind a survey boat, allowing maintenance of the streamer without reeling the streamer back onto the survey boat. ROVs may also be used for other tasks in marine exploration, such as placing equipment on the seabed.

ROVs frequently do not operate independently, but instead are deployed from and supported by another vessel that may be referred to as a "mother" vessel for the ROV. A mother vessel may deploy the ROV, retrieve the ROV, provide control facilities for people to control operation of the ROV, carry spare parts for the ROV, carry detachable equipment of the ROV, carry equipment for repairing the ROV, supply fuel to the ROV, and/or provide electrical power to the ROV. While a mother vessel typically supports operation of the ROV, other vessels may also provide support to an operational ROV. A mother vessel may also be referred to as a support vessel, a launch and recovery vessel, a mother ship, a control vessel, or a control ship.

As mentioned above, a launch and recovery system (LARS) for an ROV can be equipped with active heave compensation (AHC) to keep the ROV docking station (e.g., a tether management system (TMS)), stable while a vessel (e.g., a mother vessel) is moving, e.g., heaving, rolling, and/or pitching, as a result of wave action. These motions of the vessel may be sensed (e.g., by an inertial sensing system) and measured. The motions may also be recorded using a motion recording unit (MRU). An MRU may be mounted on the vessel and located near the LARS or located away from the LARS.

Figure 1:
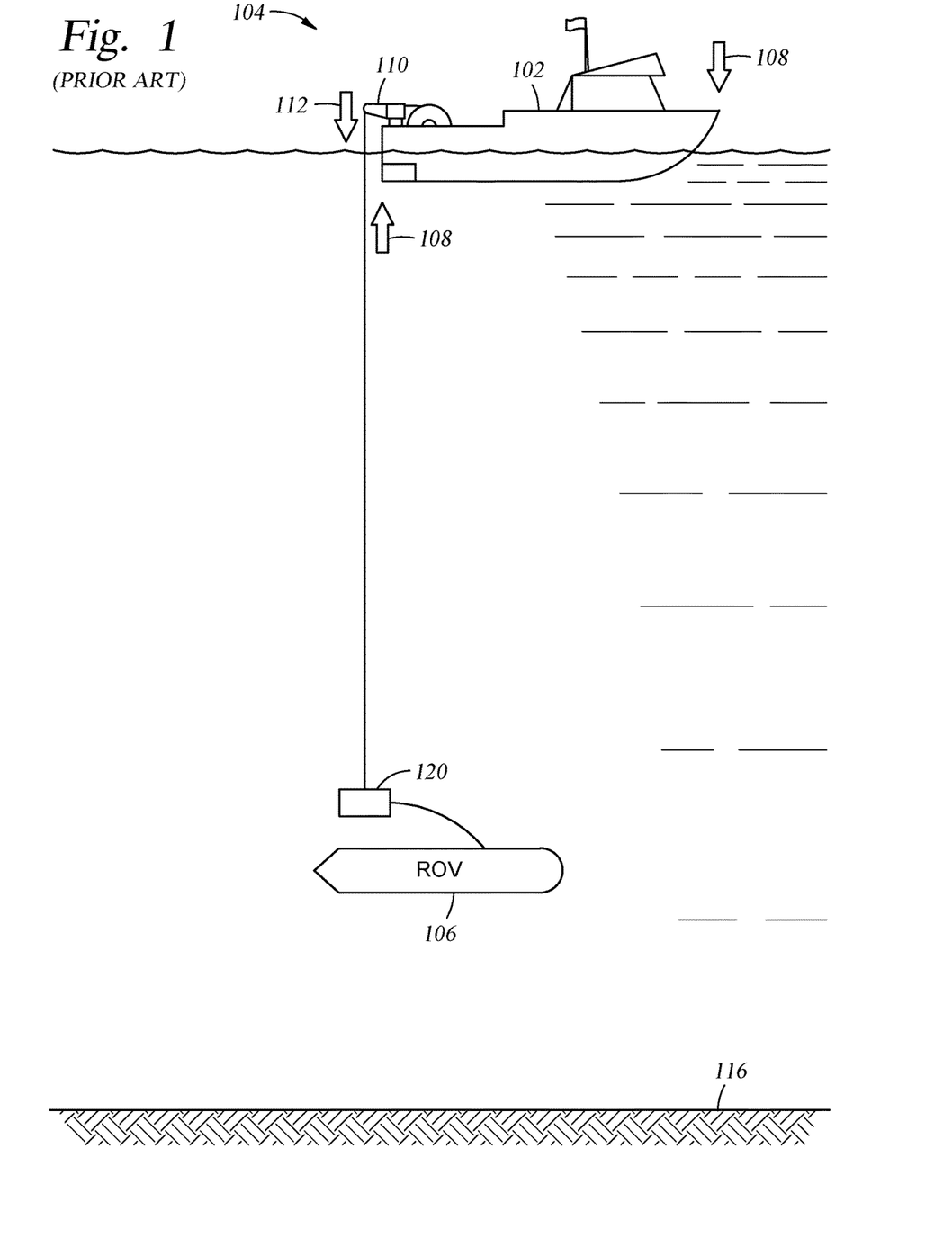
FIG. 1 illustrates an exemplary mother vessel with a LARS and an ROV operating according to previously known techniques.

FIG. 1 illustrates an exemplary mother vessel 102 with a LARS 104 and an ROV 106 operating according to previously known techniques. The LARS 104 comprises a crane 110, which comprises one or more actuators (not shown) used to position the crane 110, and a docking station 120. As used herein, a docking station includes any type of ROV docking station, including TMSs, docking stations for tetherless ROVs, and docking stations for ROVs that have tethers managed by devices other than the docking station. The docking station 120 is suspended from the tip of the crane 110 by one or more cables. Because the docking station 120 is heavy, it hangs directly or almost directly beneath the tip of the crane 110 and follows the motions of the tip of the crane 110. In FIG. 1, the ROV 106 is deep (e.g., 100 meters or more) under the surface of the water. As previously mentioned above, the wave action at the surface has very little direct effect on the ROV 106, because the ROV 106 is deep under the surface, and thus the ROV 106 has very little vertical movement with respect to the sea floor 116.

The mother vessel 102 in FIG. 1 is rolling, pitching, and/or heaving, as illustrated by the arrows 108 at the bow and stern of the mother vessel 102. The LARS 104 of the mother vessel 102 is equipped with an AHC (not shown), which sends commands to the one or more actuators of the LARS 104. The commands cause the actuators to counteract the movements of the mother vessel 102 by, for example, moving the tip of the crane 110 of the LARS 104. The movement of the tip of the crane 110 is illustrated by the arrow 112. By counteracting the movements of the mother vessel 102, the AHC allows the docking station 120 to remain nearly stationary with respect to the sea floor 116 despite the movement of the mother vessel 102 caused by the wave action. Launching and recovery (e.g., docking and undocking) operations of the ROV 106 are improved by use of the AHC, because the docking station 120, to which the ROV 106 docks and undocks, is nearly stationary with respect to the sea floor 116.

Figure 2:
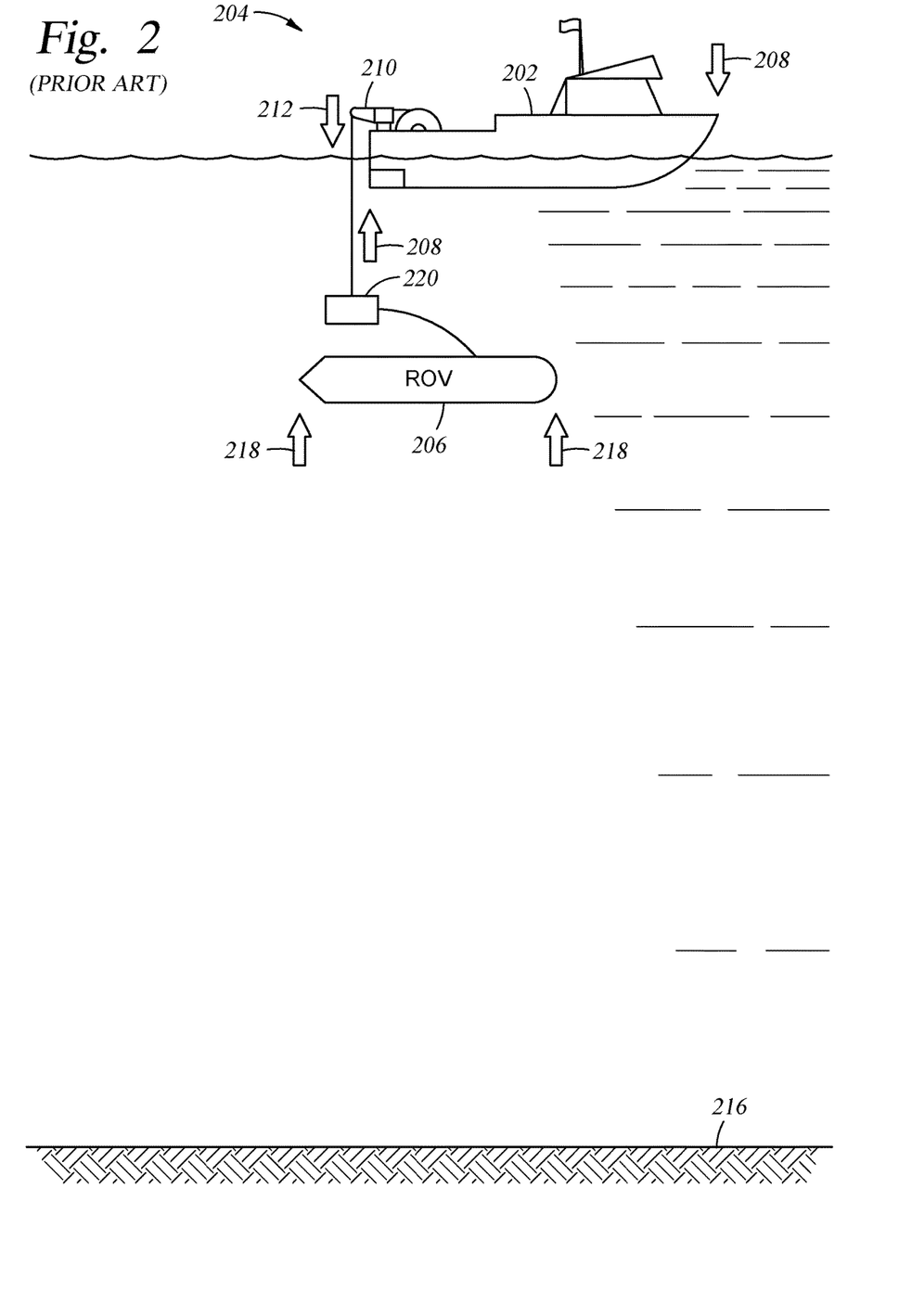
FIG. 2 illustrates an exemplary mother vessel with a LARS and an ROV operating according to previously known techniques.

FIG. 2 illustrates an exemplary mother vessel 202 with a LARS 204 and an ROV 206 operating according to previously known techniques. As in FIG. 1, the LARS 204 comprises a crane 210, which comprises one or more actuators (not shown) used to position the crane 210. The LARS 204 also comprises a docking station 220 (e.g., a TMS) that is suspended from the tip of the crane 210 by one or more cables and follows the motions of the tip of the crane 210. In FIG. 2, the ROV 206 is relatively near to (e.g., less than ten meters below) the surface of the water. As previously mentioned, the wave action at the surface may have a significant effect on the ROV 206, because the ROV 206 is near the surface, and thus the ROV 206 may have significant vertical movement with respect to the sea floor 216. The movement of the ROV 206 caused by the wave action is illustrated by the arrows 218.

As in FIG. 1, the mother vessel 202 in FIG. 2 is rolling, pitching, and/or heaving, as illustrated by the arrows 208 at the bow and stern of the mother vessel 202. As in FIG. 1, the LARS 204 of the mother vessel 202 is equipped with an AHC (not shown), which sends commands to one or more actuators (not shown) of the LARS 204. The commands cause the actuators to counteract the movements of the mother vessel 202 by, for example, moving the tip of the crane 210 of the LARS 204. The movement of the tip of the crane 210 is illustrated by the arrow 212. By counteracting the movements of the mother vessel 202, the AHC allows the docking station 220 to remain nearly stationary with respect to the sea floor 216 despite the movement of the mother vessel 202 caused by the wave action. Launching and recovery (e.g., docking and undocking) operations of the ROV 206 in this situation are not improved, however, by use of the AHC, because motion of the docking station 220, to which the ROV 206 docks and undocks, is reduced while the ROV 206 is rolling, pitching, and heaving due to the wave action.

Figure 3:
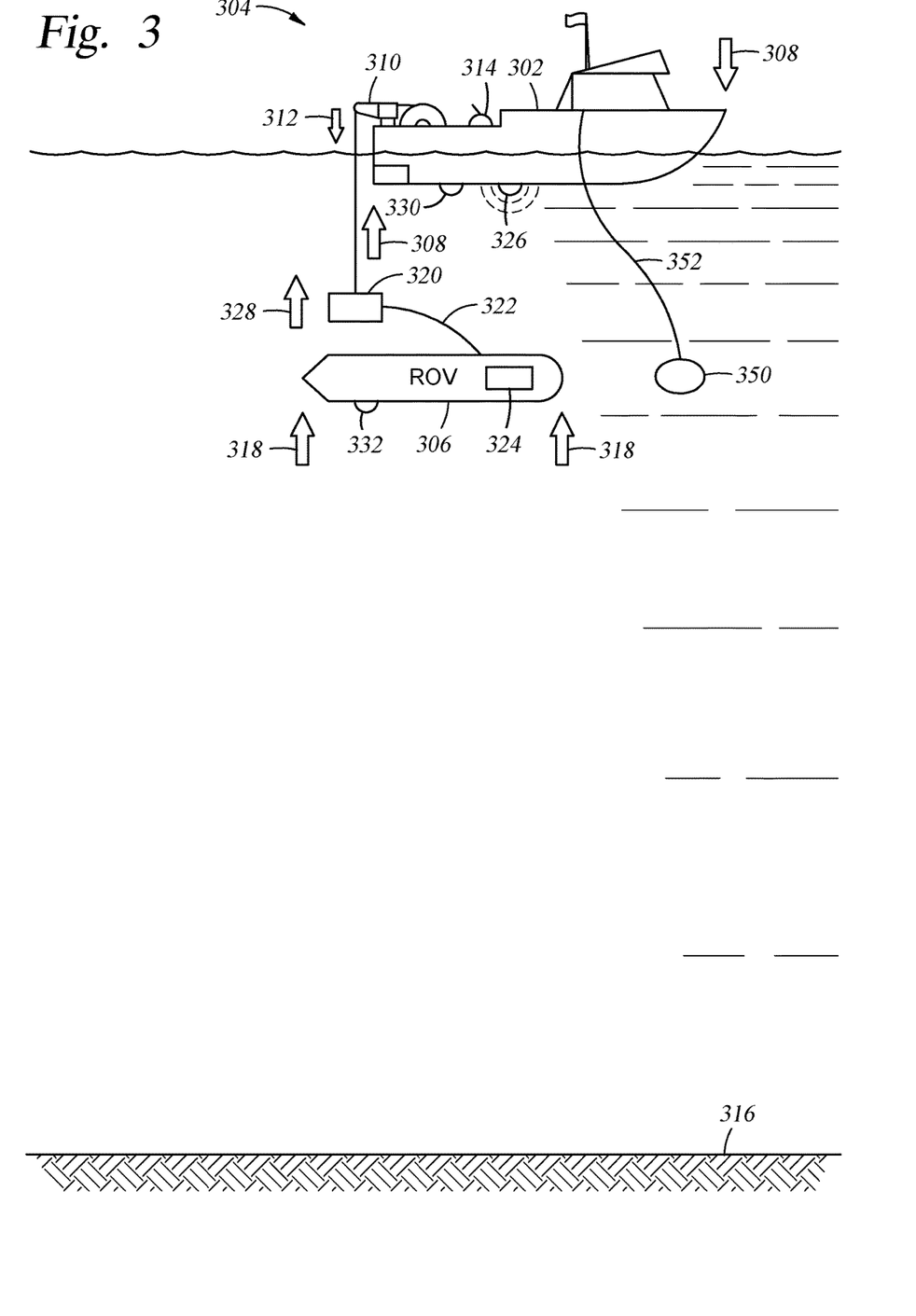
FIG. 3 illustrates an exemplary mother vessel with a LARS and an ROV operating according to aspects of the present disclosure.

FIG. 3 illustrates an exemplary mother vessel 302 with a LARS 304 and an ROV 306 operating according to aspects of the present disclosure. As in FIGS. 1 and 2, the LARS 304 comprises a crane 310, which comprises one or more actuators (not shown) used to position the crane 310. The LARS 304 also comprises a docking station 320 (e.g., a TMS) that is suspended from the tip of the crane 310 by one or more cables and follows the motions of the tip of the crane 310. As in FIG. 2, the ROV 306 in FIG. 3 is relatively near to (e.g., less than ten meters below) the surface of the water. As previously mentioned, the wave action at the surface has a significant effect on the ROV 306, because the ROV 306 is near the surface, and thus the ROV 306 has significant vertical movement with respect to the sea floor 316. The movement of the ROV 306 caused by the wave action is illustrated by the arrows 318.

As in FIGS. 1 and 2, the mother vessel 302 in FIG. 3 is rolling, pitching, and/or heaving, as illustrated by the arrows 308 at the bow and stern of the mother vessel 302. The LARS 304 of the mother vessel 302 is equipped with an active motion compensation system 303 that includes an embodiment of the present disclosure. The active motion compensation system 303 may receive information regarding particle (e.g., water particle) motion in water surrounding the ROV 306 from an MRU 324, inertial sensing system, or other motion sensing system (not shown) on the ROV 306. That is, the active motion compensation system 303 may receive information directly regarding the particle motion in the water surrounding the ROV. As used herein, surrounding means within a distance of 30 meters from the ROV. Additionally or alternatively, the active motion compensation system 303 may receive ROV motion information and/or TMS motion information and use ROV and/or TMS motion information in determining particle motion in the water surrounding the ROV. The information regarding the movements of the ROV 306 may be carried via, for example, cables in a tether 322, which may also carry commands to the ROV 306 from operators aboard the mother vessel 302. Although the tether 322 is shown terminating at the docking station 320, the disclosure is not so limited and embodiments of the present disclosure may be used with a tether 322 that connects the ROV 306 with the LARS crane 310 via the docking station 320. Alternatively or additionally, one or more motion sensors, e.g., an acoustic positioning system 326 or optical motion detector (e.g., a laser motion detector) 314, aboard the mother vessel 302 may supply information regarding movements of the ROV 306 and/or particle motion in the water surrounding the ROV to the active motion compensation system 303. While the laser motion detector 314 is shown separated from the crane 310, the disclosure is not so limited, and the optical motion detector 314, such as a laser motion sensor, may be mounted on or near the crane 310.

Additionally or alternatively, the active motion compensation system 303 may receive information regarding the motions of the mother vessel 302 and/or the motions of the ROV 306 and/or the particle motion in the water surrounding the ROV from a motion sensing system. The motion sensing system may generally comprise a computing system, an energy emitter 330, and an energy receiver 332, each of which may be mounted on the mother vessel 302 or on the ROV 306. The energy emitter may be, for example, one or more speakers 326 for emitting sound waves, one or more antennas for emitting radio waves, or one or more lasers for emitting electromagnetic energy. The energy receiver may be, for example, one or more hydrophones to receive sound waves, one or more antennas to receive radio waves, or one or more optical detectors. The computing system of the motion sensing system may interpret data regarding the received energy to determine motions of the ROV 306 and/or the mother vessel 302 and/or the particle motion in the water surrounding the ROV. The motion sensing system may optionally comprise a wave motion sensor 350 that senses wave motion and/or particle motion in the water surrounding the ROV and sends data regarding the sensed wave motion and/or particle motion to the active motion compensation system 303 via one or more cables 352. The wave motion sensor 350 may include, for example, a predominantly neutrally buoyant device (e.g., producing a buoyant force of 0.9 to 1.1 times the weight of the device) equipped with motion sensors that senses particle motion in water near the ROV 306 and/or the docking station 320. A second example of a wave motion sensor 350 may include a buoyant device equipped with motion sensors that floats on the surface of the water and gathers data regarding water motion at the surface, in which case the computing system of the motion sensing system may interpret the gathered data to determine water motion near the ROV 306 and/or the docking station 320. A third example of a wave motion sensor 350 may include a buoyant device that floats on the surface of the water that is tethered to a non-buoyant motion sensing device that is suspended near the ROV 306 and/or the docking station 320.

Additionally or alternatively, the active motion compensation system 303 may receive information regarding the particle motion in the water surrounding the ROV from a flow sensor (e.g., a Doppler sensor) disposed on the docking station 320. The flow sensor may detect water flow past the docking station 320 (e.g., wave-induced water motion), and the active motion compensation 303 system may receive the particle motion information via one or more cables and/or the tether 322.

The active motion compensation system 303 sends commands to one or more actuators (e.g., motors, not shown) of the LARS 304. The commands cause the actuators to counteract the movements of the mother vessel 302 by, for example, moving the tip of the crane 310 of the LARS 304 to align the movements of the docking station 320 relative to the sea floor 316 with the movements of the ROV 306 relative to the sea floor 316. That is, the active motion compensation system 303 compensates for the motion of both the ROV 306 and the mother vessel 302 and sends commands (e.g., to actuators of the crane 310) synchronizing motions of the docking station 320 with motions of the ROV 306. As used herein, "synchronizing motions" means causing the motion of a first object and the motion of a second object to be similar enough to allow easy connection of the first and second objects. For example, a first object may be caused to be displaced within 10% of the displacement of a second object, with a speed of the first object within 10% of a speed of the second object, within one second of a motion of the second object. In some embodiments, "synchronizing motions" refers only to displacements and speeds in a vertical (e.g., perpendicular to a surface of the water) direction. The movement of the tip of the crane 310 is illustrated by the arrow 312. The movement of the docking station 320 with respect to the sea floor 316 is illustrated by the arrow 328. By counteracting the movements of the mother vessel 302 and the ROV 306, the active motion compensation system 303 allows the docking station 320 to remain nearly stationary with respect to the ROV 306 despite the movement of the ROV 306 and the mother vessel 302 caused by the wave action. Launching and recovery (e.g., docking and undocking) operations of the ROV 306 are improved by use of the active motion compensation system 303, because motion of the docking station 320, to which the ROV 306 docks and undocks, is nearly stationary with respect to the ROV 306 while the ROV 306 is moving due to the wave action.

Figure 4:
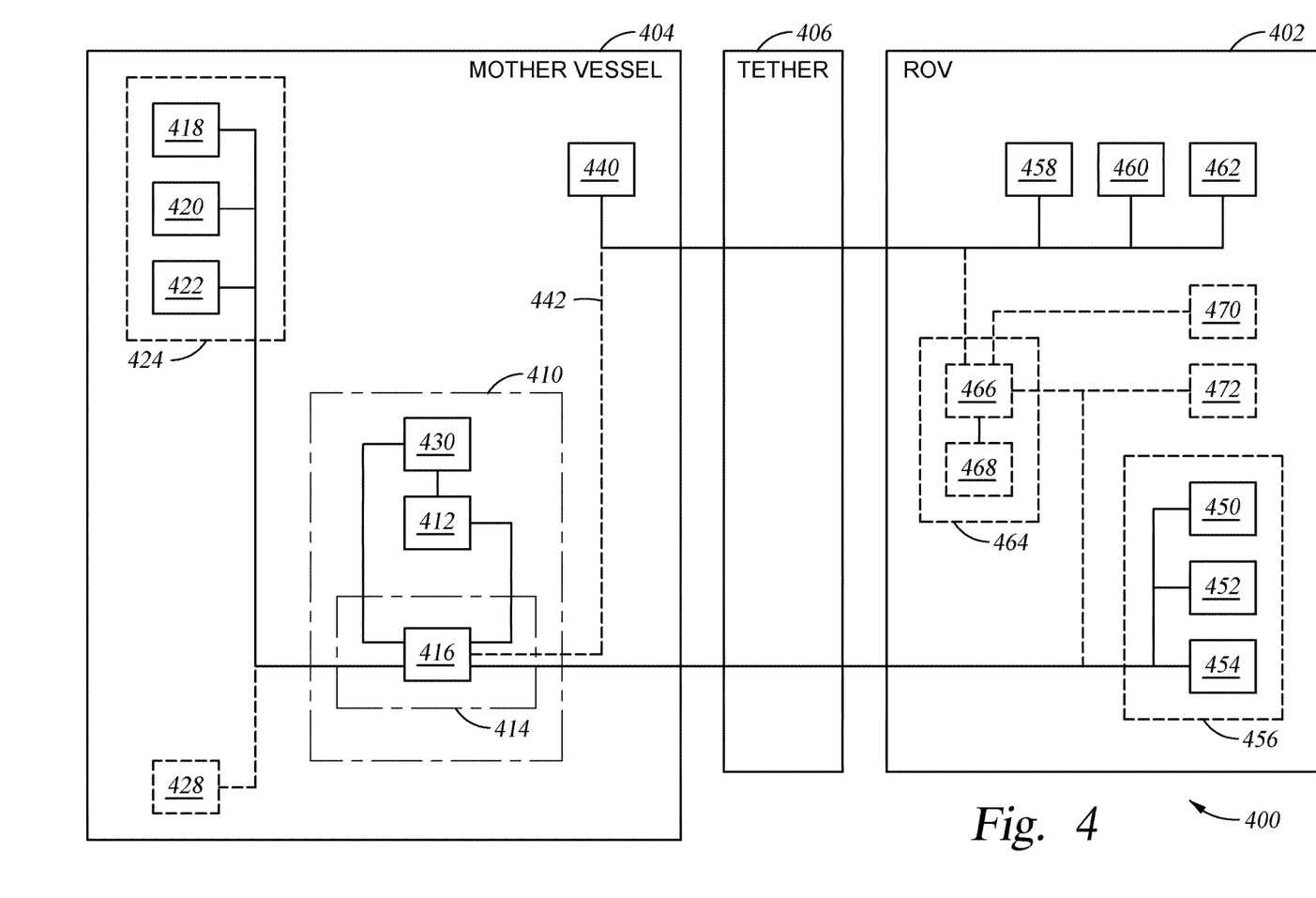
FIG. 4 a block diagram of an exemplary system in which aspects of the present disclosure may be practiced.

FIG. 4 illustrates a block diagram of an exemplary system 400 in which aspects of the present disclosure may be practiced. The system 400 includes an ROV 402 and a mother vessel 404. The ROV 402 is tethered to the mother vessel 404 via a tether 406 that includes one or more cables (e.g., conductors, fiber-optic cables) that carry commands and data between the ROV 402 and the mother vessel 404.

The ROV 402 includes one or more motion sensors (e.g., accelerometers) 450, 452, 454 that detect and measure motion of the ROV 402. The motion sensors 450, 452, 454 may be separate units or may be integrated into a MRU 456. The MRU 456 is drawn with dashed lines to show that it is optional. The motion sensors 450, 452, 454 and/or MRU 456 output signals (e.g., electrical signals, light pulses carried via fiber optics) conveying information regarding the motion of the ROV 402. The signals, which may be digital or analog signals, are conveyed to the mother vessel 404 via the cables of the tether 406. The ROV 402 also includes at least one motor 458, rudder 460, and/or thruster 462 used to maneuver the ROV 402. One or more computers 464 may be included in the ROV 402 to control the ROV 402 and/or communicate (e.g., via the cables in the tether 406) with systems (e.g., systems for controlling the ROV 402) aboard the mother vessel 404. The computers 464 may include one or more processors 466 and memory 468. The ROV 402 may also include one or more water motion sensors 470 that may measure motion of particles of water near the ROV 402. The water motion sensors may comprise Doppler motion sensors, flow meters, or other types of motion sensors. The water motion sensor 470 is drawn with dashed lines to show that the water motion sensor is optional. The ROV 402 may additionally include one or more energy receivers (e.g., hydrophones, light sensors, antennas) for receiving energy emitted from another vessel (e.g., the mother vessel 404) and provide measurements of movements of the ROV 402 to the computer(s) 464 of the ROV 402 and/or an active motion compensation system 414.

The mother vessel 404 includes a LARS 410, a control system 440 for controlling the ROV 402, and an optional wave motion sensor 428. The LARS 410 includes a crane 412, a control system 430, and an active motion compensation system 414. The control system 430 includes an interface (e.g., touchscreen, joystick, and/or keyboard) for accepting commands from an operator who controls the LARS 410. The optional wave motion sensor 428 may comprise a buoy equipped with motion sensors (e.g., an MRU) and tethered to the mother vessel 404, such as wave motion sensor 350 shown in FIG. 3. Additionally or alternatively, the optional wave motion sensor 428 may comprise a flow sensor (e.g., a Doppler sensor) disposed on a docking station (e.g., a TMS).

The active motion compensation system 414 may be an embodiment of the present disclosure. The active motion compensation system 414 includes one or more computers 416 that control the crane 412 and/or communicate with the motion sensors 450, 452, 454 aboard the ROV and/or motion sensors (e.g., accelerometers, inertial motion sensors) 418, 420, 422 aboard the mother vessel 404 and/or the optional wave motion sensor 428. The motion sensors 418, 420, 422 detect and measure motion of the mother vessel. The motion sensors 418, 420, 422 may be separate units or may be integrated into a MRU 424. The motion sensors 418, 420, 422 and/or MRU 424 output signals (e.g., electrical signals, light pulses carried via fiber optics) conveying information regarding the motion of the mother vessel. The wave motion sensor 428 detects and measures wave action and sends information regarding the wave action to the active motion compensation system 414. The computers 416 accept commands from the control system 430, receive measurements of motions of the mother vessel from the motion sensors 418, 420, 422, receive measurements of motions of the ROV from the motion sensors 450, 452, 454, optionally receive measurements of the wave action from the wave motion sensor 428, and then combine the control system commands and motion data (e.g., motion measurements) from the mother vessel 404 and ROV 402 to determine crane movements that move the tip of the crane 412 in alignment with movement of the ROV 402 as described above. The computers 416 of the active motion compensation system 414 then send the determined commands to the crane 412 (e.g., to motors and/or actuators) to cause those movements, i.e., to move the tip of the crane 412 in alignment with movement of the ROV 402 as described above.

According to aspects of the present disclosure, an active motion compensation system (e.g., active motion compensation system 414 in FIG. 4) may receive information from a control system of an ROV (e.g., control system 440) regarding commanded movements of the ROV (e.g., via connection 442) and use that information in determining commands to send to actuators (e.g., motors of a crane) of a LARS (e.g., LARS 410). The active motion compensation system may vector add or vector subtract the commanded movements from wave-driven movements of the ROV to determine commands to send to the actuators of the LARS. For example, an active motion compensation system may receive information from an ROV control system indicating the ROV is being commanded to rise in the water, and the active motion compensation system may then determine commands to hold the tip of the crane (and the docking station attached to it) relatively still with respect to the ROV so that the ROV can approach the docking station, rather than moving the tip of the crane to raise the docking station in alignment with the rising ROV.

According to aspects of the present disclosure, an active motion compensation system may synchronize motion of a docking station to motion of an ROV in amplitude and/or phase (e.g., amplitude and phase of wave-driven movements of the ROV). In at least one embodiment, this can be accomplished by measuring the motion of the ROV and/or predicting the motion of the ROV for values that can be applied in a control system (e.g., control software) to reduce and/or minimize a residue between the motion of the ROV and the motion of the docking station.

According to aspects of the present disclosure, an active motion compensation system may estimate ROV motion by determining a relationship between a wave (e.g., height, period, direction, etc.) and a motion (e.g., heave) response of the ROV, and calculating the vertical motion of the ROV based at least in part on a measurement of the actual wave. In at least one embodiment, measurement of the actual wave may be accomplished with an optical sensor (e.g., a laser sensor, a camera). In at least one other embodiment, measurement of the actual wave may be accomplished with a buoy equipped with motion sensors floating in the water.

While the above system is described as using motion sensors on board an ROV, embodiments of the disclosure are not limited to using a sensor on board the ROV. In at least one embodiment, direct measurements of the motion of an ROV can be acquired using acoustic positioning systems (e.g., high sampling rate acoustic positioning systems), and/or laser distance measurement systems.

Aspects of the present disclosure can include methods, apparatus, and machine-readable media for motion compensation adapted to reduce and/or minimize relative vertical motion between an object connected to a vessel and an object in the water subject to wave induced motions, as described above.

Figure 5:
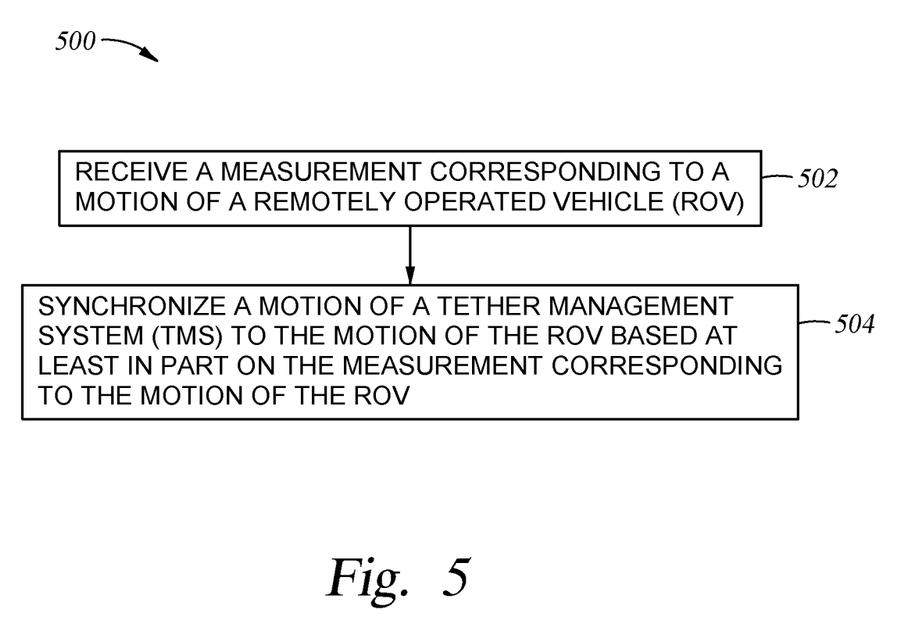
FIG. 5 sets forth an example operation for motion compensation between water-borne objects, in accordance with certain aspects of the present disclosure.

FIG. 5 sets forth an operation 500 that may be performed by an active motion compensation system, according to aspects of the present disclosure. Operation 500 begins at block 502, where the active motion compensation system receives a measurement corresponding to a particle motion in water surrounding an ROV. At block 504, the active motion compensation system synchronizes a motion of a docking station with a motion of the ROV based at least in part on the measurement corresponding to the particle motion.

According to aspects of the present disclosure, the motion of the ROV can be a motion in a vertical plane. For example, motion of an ROV can be measured relative to a sea floor below the ROV.

According to aspects of the present disclosure, an ROV control system may cease sending movement commands to an ROV for a period of time while an active motion compensation system synchronizes a motion of a docking station to motion of the ROV that is caused by wave action.

According to aspects of the present disclosure, an active motion compensation system may receive measurements of motion of an object floating (e.g., a buoy) near the docking station. The active motion compensation system may determine motions of an ROV that is also near the docking station based on the measurements and synchronize (e.g., by commanding movements of a crane) motion of the docking station to the motions of the ROV.

According to aspects of the present disclosure, an active motion compensation system may receive measurements of wave action from sensors on a docking station. For example, a docking station may be equipped with a Doppler sensor and/or a pressure sensor to measure velocity and pressure (both static and dynamic) of water near the docking station to determine wave action. The active motion compensation system may determine motions of an ROV that is near the docking station based on the measurements and synchronize motion of the docking station to the motions of the ROV.

According to aspects of the present disclosure, an active motion compensation system may receive measurements of wave action from sensors located at a distance from a docking station. For example, a mother vessel may be equipped with a laser-range finder and/or a video camera to measure wave height and wave frequency or wave length near the docking station to determine wave action. The active motion compensation system may determine motions of an ROV that is near the docking station based on the measurements and synchronize motion of the docking station to the motions of the ROV.

At least one embodiment of the present disclosure can include a non-transitory machine-readable medium storing instructions executable by a processing resource (e.g., a processing system, a CPU) to cause a machine to determine a set of wave properties above an ROV, determine a motion response of the ROV, and calculate a motion of the ROV based at least in part on the set of wave properties and the motion response. In at least one embodiment of the present disclosure, the instructions can include instructions executable by a processing resource to cause the machine to synchronize a motion of a docking station to the motion of the ROV based at least in part on the calculation of the motion of the ROV.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A method, comprising:
receiving a measurement of wave action in water surrounding a remotely operated vehicle;
subsequent to receiving the measurement, directing movement of the remotely operated vehicle to dock the remotely operated vehicle with a docking station;
synchronizing a motion of the docking station with a motion of the remotely operated vehicle based at least in part on the measurement; and
ceasing directed movement of the remotely operated vehicle while receiving the measurement.

2. The method of claim 1, wherein the motion of the remotely operated vehicle is in a vertical plane.

3. The method of claim 1, further comprising:
determining the measurement of the wave action using at least one sensor.

4. The method of claim 3, wherein determining the measurement comprises at least one of:
measuring a motion of a predominantly neutrally buoyant device in the water; and
measuring a flow of the water with a Doppler sensor disposed on the docking station.

5. The method of claim 1, wherein the measurement comprises a measurement of the wave action at the surface of the water.

6. A system, comprising:
a remotely operated vehicle;
at least one wave motion sensor deployable in water and operable therein to determine a measurement of wave action in water surrounding the remotely operated vehicle; and
a launch and recovery system operable to synchronize a motion of a docking station with a motion of the remotely operated vehicle based at least in part on the measurement of the wave action.

7. The system of claim 6, wherein the docking station comprises a tether management system.

8. The system of claim 6, further comprising an acoustic positioning system operable to determine a position of the remotely operated vehicle.

9. The system of claim 6, further comprising a motion recording unit operable to determine a position of the remotely operated vehicle.

10. The system of claim 6, wherein the at least one wave motion sensor is disposed on the remotely operated vehicle.

11. The system of claim 6, further comprising at least one sensor operable to determine a position of the remotely operated vehicle, wherein the at least one sensor comprises:
at least one energy emitter; and
at least one energy receiver.

12. The system of claim 11, further comprising a mother vessel, wherein the at least one energy emitter and the at least one energy receiver are both disposed on the mother vessel.

13. The system of claim 11, further comprising a mother vessel, wherein the at least one energy emitter is disposed on the remotely operated vehicle and the at least one energy receiver is disposed on the mother vessel.

14. The system of claim 11, further comprising a mother vessel, wherein the at least one energy emitter is disposed on the mother vessel and the at least one energy receiver is disposed on the remotely operated vehicle.

15. The system of claim 11, wherein the at least one energy emitter is one of a speaker, an antenna, and a laser.

16. The system of claim 6, further comprising at least one sensor operable to determine a position of the remotely operated vehicle, wherein the at least one sensor comprises a buoyant device.

17. The system of claim 6, further comprising:
a buoyant device;
a non-buoyant device coupled to the buoyant device; and
at least one sensor operable to determine a position of the remotely operated vehicle, wherein the at least one sensor is disposed on the non-buoyant device.

18. The system of claim 6, further comprising a Doppler sensor disposed on the docking station.

19. The system of claim 6, wherein the at least one wave motion sensor is operable to determine a measurement of the wave action at the surface of the water.

20. A method, comprising:
receiving a measurement of wave action in water surrounding a remotely operated vehicle;
synchronizing a motion of a docking station with a motion of the remotely operated vehicle based at least in part on the measurement; and
determining the measurement of the wave action using at least one sensor, wherein determining the measurement comprises measuring a motion of a predominantly neutrally buoyant device in the water.

21. The method of claim 20, wherein the motion of the remotely operated vehicle is in a vertical plane.

22. The method of claim 20, wherein determining the measurement further comprises measuring a flow of the water with a Doppler sensor disposed on the docking station.

23. The method of claim 20, wherein the measurement comprises a measurement of the wave action at the surface of the water.

* * * * *